P. CONTAMIN.
DEVICE FOR PRODUCING SULFUR DIOXID.
APPLICATION FILED SEPT. 7, 1909.
996,215.  Patented June 27, 1911.
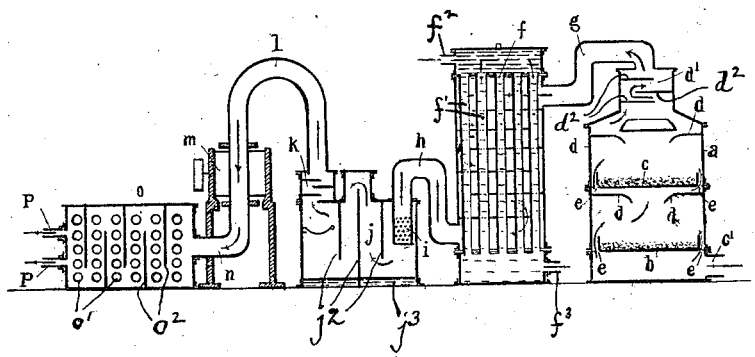

UNITED STATES PATENT OFFICE.

PHILIBERT CONTAMIN, OF PARIS, FRANCE.

DEVICE FOR PRODUCING SULFUR DIOXID.

996,215.  Specification of Letters Patent.  Patented June 27, 1911.

Application filed September 7, 1909. Serial No. 516,375.

*To all whom it may concern:*

Be it known that I, PHILIBERT CONTAMIN, a citizen of the Republic of France, and resident of 116 Boulevard Richard-Lenoir, Paris, Seine, France, have invented new and useful Improvements in Devices for Producing Sulfur Dioxid, of which the following is a specification.

My invention relates to apparatus for the production of sulfurous gases to be used for disinfecting houses, and for destroying rodents and extinguishing fires. Experience has shown that the uses of these gases at low temperatures is to be preferred, and furthermore it is important to remove from the gases obtained all impurities, and my apparatus has been designed with a view of satisfying these conditions and supplying a gas which has been purified as stated.

The invention consists in the novel construction, arrangement and combination of parts as hereinafter fully described, illustrated in the accompanying drawing and pointed out in the appended claim.

The drawing shows a vertical sectional view of the apparatus.

$a$ indicates the combustion chamber within which are arranged two superposed plates $b$, $c$, spaced apart and upon which plates the sulfur powder is placed.

$e$ are openings or channels at the edges of the plates and $d$ are baffle plates arranged horizontally and extending inwardly from the wall of the chamber and leaving a central passage for the flow of the gases to the openings $e$. Air is admitted to the combustion chamber through a pipe $c'$ adjacent the bottom of said chamber.

The combustion chamber is provided at the top with an upwardly extending neck or extension $d'$ containing a series of horizontal baffle plates $d^2$ and from said extension leads a pipe $g$, which communicates with a chamber $f$ containing a plurality of vertical conduits or pipes $f'$ forming between them a plurality of spaces for the flow of the gases around the said conduits $f'$. A cooling medium, as water, is supplied to the conduits $f'$ whereby to cool the gases circulating around said conduits, the water being admitted at the top of chamber $f$, through a pipe $f^2$ and flowing out through a pipe $f^3$ at the bottom.

A pipe $h$, adjacent the bottom of chamber $f$ leads from the said chamber and communicates with the interior of a separating chamber $j$, provided interiorly with a plurality of vertical partitions $j^2$ arranged so as to provide a zig-zag course for the gases when passing through said chamber. The end of the pipe $h$, which terminates within the chamber $j$, has a finely reticulated portion $i$, which serves to separate impurities from the gases. The lower part of the chamber $j$, is adapted to contain water as indicated at $j^3$ which serves to more effectually separate dust, etc., which may be in suspension in the gases as the latter come into contact with said water.

The chamber $j$, is provided toward its discharge or outlet end with a plurality of baffle plates $k$ arranged to provide a zig-zag course for the gases and said chamber communicates by means of a pipe $l$ with a pump $m$, driven by a motor for drawing the gases through the apparatus and forcing them through a pipe $n$, into a refrigerating chamber $o$, having a plurality of refrigerating pipes $o'$ containing a refrigerating medium. The chamber $o$ also contains a plurality of vertical baffle plates $o^2$ providing a zig-zag course for the gases as they are being cooled. The cooled gases are forced through the outlet pipes $p$, directly to the room or other place where the gases are to be used.

It will be noted that the refrigeration of the gas is effected immediately prior to being forced to the point of use and only after having passed through the pump, and said gases are thus adapted to be used while still at a low temperature and after having been purified.

What I claim is:

In an apparatus of the character described, the combination of a combustion chamber, superposed plates therein adapted to hold the burning sulfur, and baffle plates arranged within said chamber so as to cause the gases to flow in a zig-zag course through said chamber, a cooling chamber in communication with the combustion chamber, cooling pipes in the cooling chamber around which the gases are caused to flow, a separating chamber, a pipe placing the latter chamber in communication with the cooling chamber, said pipe terminating within the separating chamber in a reticulated portion, baffle plates within the separating chamber, a pump, a pipe placing the separating chamber in communication with the pump, a refrigerating chamber, a pipe placing the latter chamber in communication with the pump, and refrigerating pipes within the refrigerating chamber, all arranged for coöperation substantially as set forth.

In testimony whereof I affix my signature in presence of two witnesses.

PHILIBERT CONTAMIN.

Witnesses:
 EDMOND LECAUTURIER,
 H. C. COXE.